G. F. GRAY.
APPARATUS FOR SEALING EVACUATED VESSELS.
APPLICATION FILED DEC. 3, 1913.
1,237,200.
Patented Aug. 14, 1917.
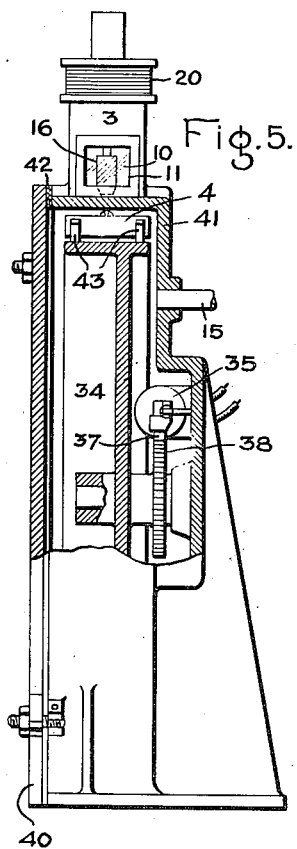
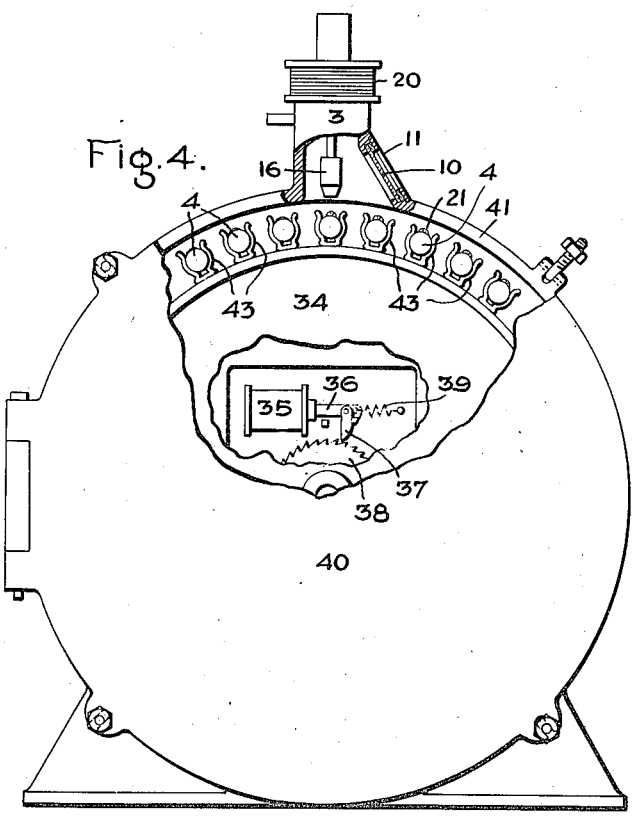
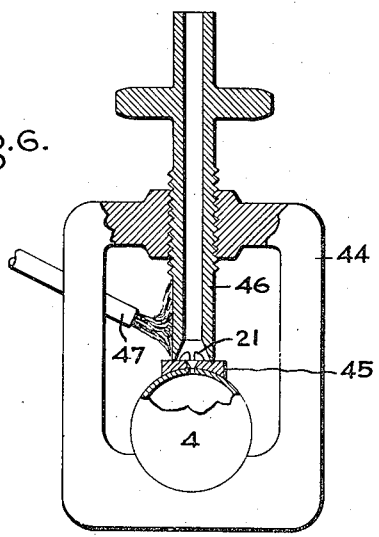
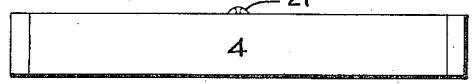
Witnesses:
Inventor:
George F. Gray,
by his Attorney.

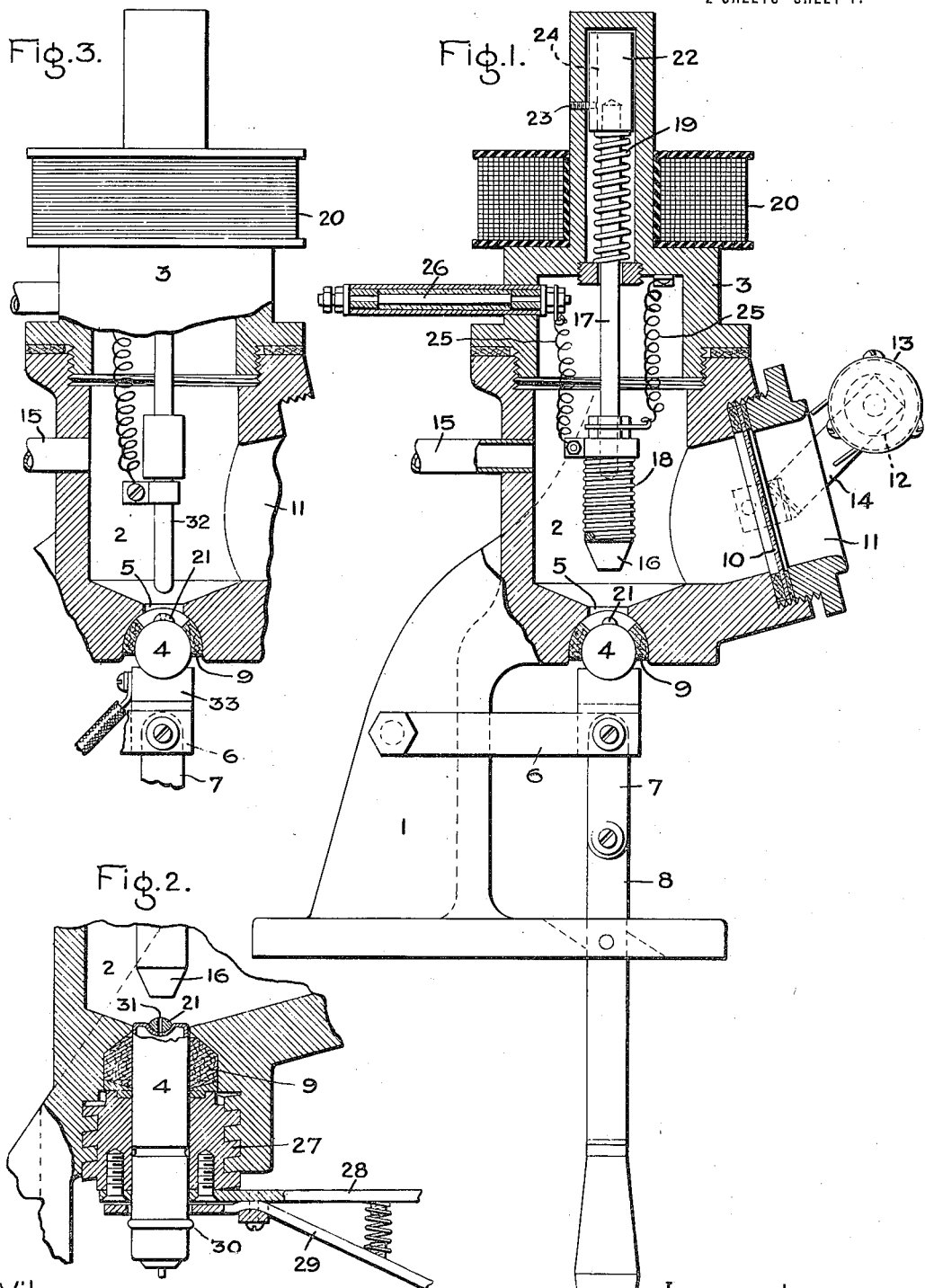

UNITED STATES PATENT OFFICE.

GEORGE F. GRAY, OF SCHENECTADY, NEW YORK, ASSIGNOR TO GENERAL ELECTRIC COMPANY, A CORPORATION OF NEW YORK.

APPARATUS FOR SEALING EVACUATED VESSELS.

1,237,200.

Specification of Letters Patent.   Patented Aug. 14, 1917.

Application filed December 3, 1913.   Serial No. 804,381.

*To all whom it may concern:*

Be it known that I, GEORGE F. GRAY, a citizen of the United States, residing at Schenectady, county of Schenectady, State of New York, have invented certain new and useful Improvements in Apparatus for Sealing Evacuated Vessels, of which the following is a specification.

My invention relates to the production of a seal for exhausted vessels, more particularly to metallic vessels which may be sealed by soldering the opening through which the air or other gas has been exhausted.

The object of my invention is to provide a means for sealing vessels after the air or other gas has been entirely or partially exhausted.

A further object of my invention is to provide a sealing machine which will allow a vessel to be exhausted of its contained gas and will fill the exhaustion opening with molten material while the proper vacuum is maintained.

Many vessels of varied shapes and sizes must have the air or other gases exhausted before they will perform the functions for which they are designed. If the vessel is wholly or partially constructed of glass and the exhaustion opening is through glass, the process of sealing off is a very simple matter. However, if the sealing off must take place in metal or any substance which requires the introduction of molten material to close the exhaustion opening, the process becomes more complicated, and the formation of a perfect seal is attended with numerous difficulties.

My invention provides a machine which will successfully form such a seal and also provides a machine which does not require a high degree of skill for its operation. As set forth and described in the specification which follows, it is shown as especially adapted for sealing tubes which are used in manufacturing protective devices known as vacuum tube lightning arresters. Its applicability is, however, not limited to use in this connection, but machines made in accordance with my invention may be designed for use in sealing vessels of any shape or size. In order to adapt it for use in connection with vessels of different shapes, it is only necessary to vary the form of the mechanism for holding the vessels in operative position while the seal is being formed.

After assembling the composite parts of these vacuum tubes, a wart of solder is formed on the side or end of the tubes, according to the construction; through this wart and through the tube casing a small hole is drilled. The tube is then placed in operative relation with the sealing machine and exhausted. When the tube has been exhausted to the proper degree, mechanism for melting the solder is set into action and the exhaustion opening is closed by the molten solder.

To melt the sealing material, many different means may be used. In one form of the machine, I have shown an electric soldering iron. In another form the sealing material is melted by passing an electric current through it, while in a third form the heat of a Bunsen burner is used to accomplish the desired result.

My invention will best be understood in connection with the accompanying drawings, which show some of the various forms in which my invention may be carried out and in which Figure 1 represent a section of one form of the machine for exhausting a single tube in which an electrically heated soldering iron is used and the exhaustion opening is on the side of the tube; Fig. 2 shows a modification of Fig. 1 adapted to seal tubes having the exhaustion opening on the end; Fig. 3 shows another form in which the seal is made by passing an electric current through the sealing material; Fig. 4 is a side view with the casing partly broken away of a machine for exhausting a plurality of tubes at the same time; Fig. 5 is an end view partly in section of the machine shown in Fig. 4; Fig. 6 shows still another modification in which the seal is made by means of a Bunsen burner; and Fig. 7 is an enlarged view of an arrester tube.

In the form of my invention shown in Fig. 1, the frame of the machine 1 is provided with a vacuum chamber 2 which has a removable cover 3. The vacuum tube 4 is firmly held in operative relation with the opening 5 in the bottom of the vacuum chamber by means of the lever 6 and the toggle joint levers 7 and 8 which are fastened to the frame of the machine. To make an air-tight connection between the tube and the machine, a gasket 9 is used. In order that the operator may watch the formation of the seal, a window 10 is mounted in a peep-hole 11 cut in the wall of the vacuum chamber. The lamp 12 with its reflector 13 supported by the bracket 14 provides light in the vacuum chamber for observation of the operation of the machine. The vacuum chamber may be connected to a pump by means of the tube 15. The soldering iron 16 having an insulated stem 17 and a heating coil 18 is supported by the cover of the machine. It is normally held in its retracted position by means of the spring 19. When the electromagnet or solenoid 20 is energized, however, the soldering iron is brought into operative relation with the solder wart 21 on the vacuum tube, and the sealing operation is performed. The tension of the spring 19 may be regulated by means of the block 22 which is screw-threaded to the upper end of the stem 17. This block is normally prevented from rotating by means of the set screw 23 which engages the slot 24 formed in one side of the block. Current is supplied to the heating coil by means of the wires 25 which are flexible to allow for the free movement of the soldering iron. One of these wires may be grounded to the frame of the machine and the other connected to the insulated stud 26, or both of them may, if desired, be led to the exterior of the vacuum chamber by means of connections insulated from the walls of the chamber.

In the modification shown in Fig. 2, a tube having an opening in the end is shown as being held in operative relation to the vacuum chamber 2 by means of the clamping nut 27. This nut is tightened by means of the wrench 28. When it is desired to withdraw the tube, the clamp 29 is pressed upward engaging a bead 30 which is formed on the tube. In this figure I have also illustrated the construction of the solder wart 21 with a hole 31 drilled through both the solder and the wall of the tube to form an exhaustion opening. This modification may easily be made in such a way that the clamping means shown may be removed and the clamping means shown in Fig. 1 may be substituted.

In the form shown in Fig. 3, the soldering iron is replaced by the conducting rod 32 which is brought into contact with the soldering wart 21 by the action of the electromagnet 20. The block 33 which holds the arrester tube is made of electrically conductive material, and is well insulated from the lever 7. When rod 32 touches the solder wart the electrical circuit is completed and the solder is melted in welding machine fashion. This form may equally well be adapted to seal tubes having the opening in the end.

In the form of the machine shown in Fig. 4, the revolving plate 34, which carries a large number of tubes, is moved by the electromagnet 35, which is under the control of the operator. The core 36 of the electromagnet carries a pivoted finger 37, which finger engages the teeth of the cog-wheel 38 as the electromagnet is excited. When the current is switched from the magnet, the spring 39 draws the core back from its normal position, the finger 37 slipping back over the cogs. This mechanism is so designed that every time that the magnet 35 is energized the plate 34 is revolved far enough to bring another tube directly under the soldering means.

Fig. 5 shows in greater detail the position of the wheel 38 and the magnet 35. The door 40 of the casing 41 in which the plate is mounted is closed on a gasket 42 to form an air-tight seal for the casing. The door may be opened and the plate 34 drawn out so that the sealed tubes may be easily removed and unsealed tubes inserted in the holding clips 43. I have indicated an electric soldering iron as the sealing means used in connection with this form of machine. It will be understood, however, that any other sealing means may be employed without departing from the scope of my invention.

In the modification shown in Fig. 6, a frame 44 holds the tube 4, which tube has a small round copper piece 45 mounted upon it. The flat surface of the copper has the solder wart 21 on it; surrounding this wart and forced into the copper plate is the end of the sharp-edged tube 46, thereby forming an air-tight connection between the arrester tube and the vacuum pump which is connected to the tube 46. After the tube 4 has been exhausted, heat is applied to the lower end of the sharp-edged tube by means of the Bunsen burner 47 and the solder, having a lower melting point than any of the surrounding metals, flows and seals tube 4.

The operation of the machine as shown in Fig. 1 is as follows: Tube 4 is set in its holder and is then forced up against the rubber gasket by the toggle joint. Connection is made to the vacuum pump, and the chamber and arrester tube are exhausted. While the vacuum is being formed, the soldering iron 16 is being heated and is ready to melt the solder as soon as the required vacuum is obtained. The circuit is then closed on the solenoid 20 and the soldering iron is forced down on to the solder and the arrester tube is sealed. The temperature of the soldering iron may be regulated by introducing an external resistance in the circuit. In the same manner the pressure of the iron on the wart, due to the solenoid strength, may be governed. By means of the peep-hole, the operator may note that the sealing is properly completed, and that the machine is in perfect working order.

My invention may be embodied in many other forms than those shown and described, and I, therefore, do not limit myself to the precise arrangement disclosed, but intend to cover by the appended claims all changes and modifications within the scope of my invention.

What I claim as new and desire to secure by Letters Patent of the United States, is:—

1. A sealing machine for sealing exhausted vessels comprising a vacuum chamber, means for holding a tube which is to be sealed in operative relation to said vacuum chamber, movable sealing means located entirely within said vacuum chamber and actuating means therefor comprising a solenoid outside of said chamber and means operated by said solenoid located entirely within said chamber for operating said sealing means to seal said tube while it is still in operative relation to the vacuum chamber.

2. A sealing machine for sealing exhausted vessels comprising a vacuum chamber, a hollow projection extending vertically from the top of said vacuum chamber and forming a part of said chamber, movable sealing means located entirely within said vacuum chamber and having a portion which extends into said hollow projection and is entirely inclosed thereby, means for holding a vessel having an exhaustion opening in operative relation to said vacuum chamber while the air is being exhausted therefrom, and a solenoid for bringing the sealing means into operative relation with the vessel to close the exhaustion opening after the air has been exhausted.

3. A sealing machine for sealing exhausted vessels comprising a vacuum chamber, a hollow projection extending from the wall of said chamber and forming a part of said chamber, movable sealing means located entirely within said chamber and having a portion which extends into said hollow projection and is entirely inclosed thereby, means for holding a vessel having an exhaustion opening in operative relation to said vacuum chamber and with the exhaustion opening a short distance from said sealing means while the air is being exhausted therefrom, and means comprising a solenoid surrounding said hollow projection for bringing the sealing means into operative relation with the vessel to close the exhaustion opening after the air has been exhausted.

4. A sealing machine for sealing exhausted vessels comprising a vacuum chamber, a hollow projection extending from the wall of said chamber and forming a part of said chamber, movable sealing means located entirely within said chamber and having a portion which extends into said hollow projection and is entirely inclosed thereby, means for holding a vessel having an exhaustion opening in operative relation to said vacuum chamber while the air is being exhausted therefrom, means for normally holding the sealing means away from said vessel, and means comprising a solenoid surrounding said hollow projection for bringing the sealing means into operative relation with the vessel to close the exhaustion opening after the air has been exhausted.

5. A sealing machine for sealing exhausted vessels comprising a vacuum chamber, a hollow projection extending from the wall of said chamber and forming a part of said chamber, a soldering iron within said chamber having a stem extending into said projection and entirely inclosed thereby, a solenoid surrounding said projection and adapted to move the soldering iron when energized, and a spring within said projection for returning the iron to its normal position when the solenoid is deënergized.

6. A sealing machine for sealing exhausted vessels comprising a vacuum chamber, a hollow projection extending outwardly from the wall of said chamber and forming a part of said chamber, a soldering iron within said chamber having a stem extending into said projection and entirely inclosed thereby, means for holding a vessel having an exhaustion opening in operative relation to said vacuum chamber and with the exhaustion opening a short distance from said soldering iron, a solenoid surrounding said projection and adapted to move the soldering iron into operative relation to said exhaustion opening when energized, and a spring within said projection for returning the iron to its normal position when the solenoid is deënergized.

In witness whereof, I have hereunto set my hand this 2nd day of December, 1913.

GEORGE F. GRAY.

Witnesses:
BENJAMIN B. HULL,
HELEN ORFORD.